United States Patent
Zhu et al.

(10) Patent No.: US 12,224,827 B2
(45) Date of Patent: Feb. 11, 2025

(54) BEAM FAILURE DETECTION AND/OR BEAM FAILURE RECOVERY PROCEDURES

(71) Applicant: Nokia Technologies Oy, Espoo (FI)

(72) Inventors: Qiping Zhu, Naperville, IL (US); Timo Koskela, Oulu (FI); Sami-Jukka Hakola, Oulu (FI)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 18/546,550

(22) PCT Filed: Apr. 27, 2021

(86) PCT No.: PCT/US2021/029394
§ 371 (c)(1),
(2) Date: Aug. 15, 2023

(87) PCT Pub. No.: WO2022/231574
PCT Pub. Date: Nov. 3, 2022

(65) Prior Publication Data
US 2024/0129007 A1    Apr. 18, 2024

(51) Int. Cl.
*H04L 27/00* (2006.01)
*H04B 7/06* (2006.01)

(52) U.S. Cl.
CPC ......... *H04B 7/0619* (2013.01); *H04B 7/0695* (2013.01)

(58) Field of Classification Search
CPC .. H04B 7/0619; H04B 7/0695; H04B 7/0404; H04B 7/088

(Continued)

(56) References Cited

U.S. PATENT DOCUMENTS

| | | | |
|---|---|---|---|
| 11,832,330 B2 * | 11/2023 | Zhang | H04B 7/0695 |
| 2019/0239212 A1 * | 8/2019 | Wang | H04L 5/0051 |

(Continued)

FOREIGN PATENT DOCUMENTS

| | | | | |
|---|---|---|---|---|
| WO | WO-2020038546 A1 * | 2/2020 | | H04W 52/0235 |
| WO | 2021/027185 A1 | 2/2021 | | |
| WO | 2021/034672 A1 | 2/2021 | | |

OTHER PUBLICATIONS

"3rd Generation Partnership Project; Technical Specification Group Radio Access Network; NR; Physical layer procedures for control (Release 16)", 3GPP TS 38.213, V16.4.0, Dec. 2020, pp. 1-181.

(Continued)

*Primary Examiner* — Helene E Tayong
(74) *Attorney, Agent, or Firm* — Robert P. Michal, Esq.; Carter, DeLuca & Farrell LLP

(57) ABSTRACT

Systems, methods, apparatuses, and computer program products for beam failure detection and/or beam failure recovery procedures, for instance, for multi-panel user equipment (UEs) are provided. One method may include transmitting, by a UE, a beam report to a network to indicate an association between at least two downlink reference signals and at least two antenna panels at the user equipment or to indicate a selection of at least two downlink reference signals that will be used for downlink reception at the user equipment simultaneously. The method may also include activating the antenna panels corresponding to one or more of the at least two downlink reference signals, based on transmission configuration indicator (TCI) states updated by the network or based on the selection of the at least two downlink reference signals, and detecting beam failure based on at least two sets of beam failure detection resources for the active antenna panels.

17 Claims, 7 Drawing Sheets

(58) Field of Classification Search
USPC .......................................................... 375/299
See application file for complete search history.

(56) References Cited

U.S. PATENT DOCUMENTS

| | | |
|---|---|---|
| 2019/0306850 A1 | 10/2019 | Zhang et al. |
| 2019/0349059 A1 | 11/2019 | John Wilson et al. |
| 2020/0007678 A1 | 1/2020 | Zhou et al. |
| 2020/0280360 A1 | 9/2020 | Bai et al. |
| 2020/0403682 A1 | 12/2020 | Koskela et al. |
| 2021/0044342 A1 | 2/2021 | He |

OTHER PUBLICATIONS

"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.

"3rd Generation Partnership Project; Technical Specification Group Radio Access Network; NR; Medium Access Control (MAC) protocol specification (Release 16)", 3GPP TS 38.321, V16.3.0, Dec. 2020, pp. 1-156.

"3rd Generation Partnership Project; Technical Specification Group Radio Access Network; NR; Requirements for support of radio resource management (Release 15)", 3GPP TS 38.133 V15.10.0, Jun. 2020, 1162 pages.

Invitation to Pay Additional Fees received for corresponding Patent Cooperation Treaty Application No. PCT/US2021/029394, dated Feb. 9, 2022, 9 pages.

"Summary on beam management for simultaneous multi-TRP transmission with multiple Rx panels", 3GPP TSG RAN WG1 Meeting #103-e, R1-200nnnn, Agenda: 8.1.2.3, CATT, Oct. 26-Nov. 13, 2020, 40 pages.

International Search Report and Written Opinion received for corresponding Patent Cooperation Treaty Application No. PCT/US2021/029394, dated Mar. 30, 2022, 18 pages.

\* cited by examiner

BEAM FAILURE DETECTION AND/OR BEAM FAILURE RECOVERY PROCEDURES

RELATED APPLICATION

This application claims priority to PCT Application No. PCT/US2021/029394 filed Apr. 27, 2021, which is incorporated herein by reference in its entirety.

FIELD

Some example embodiments may generally relate to wireless technologies including, but not limited to, mobile or wireless telecommunication systems, such as Long Term Evolution (LTE) or fifth generation (5G) radio access technology or new radio (NR) access technology, Wi-Fi or short rage radios, or other communications systems. For example, certain example embodiments may generally relate to systems and/or methods for beam failure detection and/or beam failure recovery procedures, for instance, for multi-panel user equipment (UEs).

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may be directed to a method, which may include transmitting, by a user equipment, a beam report to a network to indicate an association between at least two downlink reference signals and at least two active antenna panels at the user equipment or to indicate a selection of at least two downlink reference signals that will be used for downlink reception at the user equipment simultaneously. The method may include detecting beam failure based on at least two sets of beam failure detection resources for the at least two active antenna panels, wherein the at least two sets of beam failure detection resources comprise one or more beam failure detection reference signals. In one example, the method may also include performing beam failure recovery according to the beam failure detected on the set of beam failure detection resources for the respective active antenna panels.

An embodiment may be directed to a method, which may include receiving at a network node, from a user equipment, a beam report to indicate an association between at least two downlink reference signals and at least two antenna panels at the user equipment and activating transmission configuration indicator (TCI) states for at least one control resource set (CORESET) or physical downlink shared channel (PDSCH) that causes the user equipment to receive physical downlink control channel (PDCCH) or physical downlink shared channel (PDSCH) with more than one active antenna panel, or configuring transmission configuration indicator (TCI) states for at least one control resource set (CORESET) or physical downlink shared channel (PDSCH) to indicate the downlink reference signals that can be used for downlink reception at the user equipment and receiving, from the user equipment, a beam report comprising an indication of a selection of at least two downlink reference signals that will be used for downlink reception at the user equipment simultaneously through the at least two antenna panels. The method may also include configuring the user equipment with at least two sets of beam failure detection resources for one or more of the at least two antenna panels.

An embodiment may be directed to an apparatus, which may include at least one processor and at least one memory comprising computer program code. The at least one memory and computer program code are configured, with the at least one processor, to cause the apparatus at least to transmit a beam report to a network to indicate an association between at least two downlink reference signals and at least two active antenna panels at the apparatus or to indicate a selection of at least two downlink reference signals that will be used for downlink reception at the apparatus simultaneously, and to detect beam failure based on at least two sets of beam failure detection resources for the at least two active antenna panels, wherein the at least two sets of beam failure detection resources comprise one or more beam failure detection reference signals.

An embodiment may be directed to an apparatus, which may include at least one processor and at least one memory comprising computer program code. The at least one memory and computer program code are configured, with the at least one processor, to cause the apparatus at least to receive, from a user equipment, a beam report to indicate an association between at least two downlink reference signals and at least two antenna panels at the user equipment and activating transmission configuration indicator (TCI) states for at least one control resource set (CORESET) or physical downlink shared channel (PDSCH) that causes the user equipment to receive physical downlink control channel (PDCCH) or physical downlink shared channel (PDSCH) with more than one active antenna panel, or to configure transmission configuration indicator (TCI) states for at least one control resource set (CORESET) or physical downlink shared channel (PDSCH) to indicate the downlink reference signals that can be used for downlink reception at the user equipment and receive, from the user equipment, a beam report comprising an indication of a selection of at least two downlink reference signals that will be used for downlink reception at the user equipment simultaneously through the at least two antenna panels. The at least one memory and computer program code may be further configured, with the at least one processor, to cause the apparatus at least to configure the user equipment with at least two sets of beam failure detection resources for one or more of the at least two antenna panels.

An embodiment may be directed to an apparatus that may include means for transmitting a beam report to a network to indicate an association between at least two downlink reference signals and at least two active antenna panels at the apparatus or to indicate a selection of at least two downlink reference signals that will be used for downlink reception at the apparatus simultaneously, and means for detecting beam failure based on at least two sets of beam failure detection resources for the at least two active antenna panels, wherein the at least two sets of beam failure detection resources comprise one or more beam failure detection reference signals.

An embodiment may be directed to an apparatus that may include means for receiving, from a user equipment, a beam report to indicate an association between at least two downlink reference signals and at least two antenna panels at the user equipment and activating transmission configuration indicator (TCI) states for at least one control resource set (CORESET) or physical downlink shared channel (PDSCH) that causes the user equipment to receive physical downlink control channel (PDCCH) or physical downlink shared channel (PDSCH) with more than one active antenna panel, or means for configuring transmission configuration indicator (TCI) states for at least one control resource set (CORESET) or physical downlink shared channel (PDSCH) to indicate the downlink reference signals that can be used for downlink reception at the user equipment and means for receiving, from the user equipment, a beam report comprising an indication of a selection of at least two downlink reference signals that will be used for downlink reception at the user equipment simultaneously through the at least two antenna panels. The apparatus may also include means for configuring the user equipment with at least two sets of beam failure detection resources for one or more of the at least two antenna panels.

BRIEF DESCRIPTION OF THE DRAWINGS

For proper understanding of example embodiments, reference should be made to the accompanying drawings, wherein.

DETAILED DESCRIPTION

Figure 1:
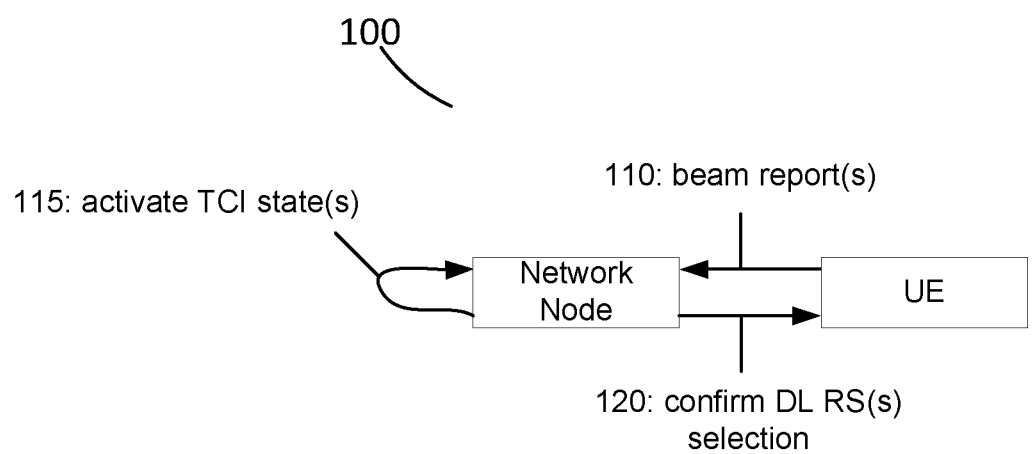
FIG. 1 illustrates an example diagram of a beam failure detection configuration and corresponding beam failure recovery, according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for beam failure detection and/or beam failure recovery procedures, for instance, for multi-panel user equipment (UEs), is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Currently, 3GPP NR supports two frequency ranges: frequency range 1 (FR1—below 6 GHz) and frequency range 2 (FR2—24.25-52.6 GHz). FR2 has larger available frequency spectrum and, as a result, it can provide much higher throughput compared to operating in FR1. With high channel pathloss, operating in FR2 usually requires high antenna gain to compensate the channel loss. Therefore, in practice, both the gNB and UE will be equipped with antenna panels to provide narrow directional beams that maintain sustainable communication.

On the UE side, multiple antenna panels can be allocated in a way that the channels for different UE panels will be hardly correlated. Then, a UE is potentially capable of transmitting/receiving data over multiple panels simultaneously, which may improve the overall throughput, reliability and latency.

In 3GPP Release-15/Release-16 NR, the beam failure detection event (beam failure instance indication from layer 1 (L1) to medium access control (MAC)) will be triggered when all downlink (DL)-reference signals (RSs) in the $q_0$ beam set are below a quality threshold (i.e., the hypothetical block error estimated for physical downlink control channel (PDCCH) based on DL RS is above the threshold value, such as 10%), which indicates that only if the downlink transmit (TX) beams associated to $q_0$ are in outage will the beam failure detection be declared.

With operation in high frequency, such as FR2, it is reasonable to assume the deployment of multi-panel UEs with the capability of simultaneous transmission/reception via different panels. However, Release-15/Release-16 beam failure detection (BFD)/beam failure recovery request (BFRQ) can only allow all UE active panels to share one beam failure detection set and one candidate beam set. The current scheme does not provide a solution for individual active UE panel beam failure detection and the corresponding panel beam failure recovery (currently a UE cannot select by itself how to divide the BFD-RS to separate sets of $q_0$, as sets are defined by the network). For the active UE panel encounters, beam failure because of channel blockage or fading, without BFD/BFRQ for this panel, can reduce the spectral efficiency and jeopardize the communications reliability.

In view of the problems mentioned above, certain example embodiments can provide at least a solution for UE partial panel beam failure detection configuration and the corresponding beam failure recovery.

As will be discussed in detail below, an embodiment may provide a method to provide panel-wise (partial) beam failure detection and beam failure recovery procedure(s) for multi-panel UE. According to an embodiment, a network may receive UE beam report indicating DL-RSs mapping to different panels, i.e., spatial filters or beams, which may be implicit or explicit. The network may activate transmission configuration indicator (TCI) state(s) for a control resource set (CORESET) (e.g., two TCI states for one CORESET) or CORESETs and/or physical downlink shared channel (PDSCH) that causes the UE to receive physical downlink control channel (PDCCH) or PDSCH with more than one active UE panel. The UE may be configured to allow mapping the DL-RSs indicated by the active TCI states according to active UE panels association to the DL-RSs reception at the UE side. In an embodiment, the UE may perform beam failure detection (BFD) according to respective set(s) of $q_0$ (i.e., beam set), where BFD-RS may be included in the respective set(s) based on UE panels information. Then, the UE may perform beam failure recovery (BFR) according to the failure declared on respective active panel(s), i.e., based on the failed BFD-RS in the set corresponding to the DL RS(s) received on a specific panel. In certain embodiments, based on the active TCI states in CORESETs or PDSCH, the UE may determine active panels for DL reception. The network may configure a beam set for each active UE panel. Then, the UE may monitor BFD for a panel through the beam set.

FIG. 1 illustrates an example diagram 100 of a beam failure detection configuration and corresponding beam failure recovery, according to some embodiments. The example 100 of FIG. 1 includes a network node and a UE. As illustrated in the example of FIG. 1, at 110, the UE may transmit beam reports, to the network node, to indicate that at least two DL-RSs can be received at the UE simultaneously through at least two UE antenna panels. At 115, the network node may activate TCI state(s) for a CORESET (e.g., two TCI states for one CORESET) or CORESETs and/or PDSCH that causes the UE to receive PDCCH or PDSCH with more than one active UE panel. Alternatively or additionally, the network node may configure one or more active TCI states for the CORESETs or PDSCH to indicate the DL-RSs that can be used for UE DL reception, and the UE may transmit the beam reports to indicate the selection of DL-RSs that will be used for DL simultaneously. In certain embodiments, at 120, the network node may reply to confirm the selection.

According to some embodiments, if the network node configures $q_0$ implicitly, the UE may be indicated that the UE can divide the on $q_0$ set into two subsets. The UE may decide the RSs at each $q_0$ subset from the active TCI states and each $q_0$ subset may be for one of the active UE DL panel. In certain embodiments, if the network node configures $q_0$ explicitly, the network node may configure two sets of $q_0$ such that each $q_0$ set contains the RSs that are associated with one of the active UE DL panel.

In some embodiments, if the UE is allowed or configured to have two $q_0$ sets, the UE may expect the network node to configure one or two $q_1$ sets. If one $q_1$ is configured, the association between the RSs in the one $q_1$ set and the UE panel may be explicitly or implicitly indicated. If two $q_1$ sets are configured, the association between the two $q_1$ sets and the UE panel may be explicitly or implicitly indicated. For two $q_0$ sets, the network node may use MAC control element (CE) to update the existing one $q_1$ set such that the one $q_1$ set includes RSs associated to different active UE DL panel.

According to certain embodiments, the UE may detect BFD based on two $q_0$ sets for two active UE DL panels if configured. For BFRQ process, different procedures based on different triggers may be provided.

For example, if the UE has just one panel for UL and DL and the other panel is for DL only, and if panel for both UL and DL is declared for BFD or both panels are declared for BFD, the UE may select the qualified RS within all configured $q_1$ (including $q_1$ for both panels) for contention free random access (CFRA) BFR. If the qualified RS does not exist, contention based random access (CBRA) BFR will be proceeded with. If the UE has just one panel for UL and DL and the other panel is for DL only, but the DL only panel is declared with BFD, the UE may, through the panel for both UL and DL, reuse the SCell BFRQ framework for DL only panel and the related MAC CE may include related BFRQ information for DL only panel. According to an embodiment, the related BFRQ information may include the associated information for the panel detected with beam failure, i.e., associated reference signal ID, panel ID, etc., and/or the related candidate beam resource information for the panel detected with beam failure.

In an example embodiment, a qualified reference signal may include a reference signal with corresponding L1-RSRP measurements that are larger than or equal to a predefined threshold, such as the $Q_{in,LR}$ threshold. Thus, in an embodiment, the UE may be configured to select a reference signal with corresponding L1-RSRP measurements that are larger than or equal to the $Q_{in,LR}$ threshold from within the configured $q_1$ for CFRA BFR.

As another example, if both active panels in the UE are for both UL and DL, and if one panel is BFD, the UE may, through the other panel, reuse the SCell BFRQ framework for the BFD panel and the related MAC CE may include related BFRQ information for the BFD panel. If both active panels in the UE are for UL and DL, but both panels are BFD, the UE may select the qualified RS within all configured $q_1$ for CFRA BFD. If the qualified RS does not exist, the UE may proceed with CBRA BFR. It is noted that, as used herein, the terms "panel is BFD," "BFD panel" or "declared for BFD" may refer to the panel being detected with beam failure.

In one embodiment, the UE may determine to divide the DL RS (indicated by the active TCI states for respective CORESETs) to their respective subsets (e.g., $q_{0,1}$/panel1,$q_{0,2}$/panel2) according to a predetermined and/or predefined rule. The UE may include the DL RS according to the predetermined rule of CORESETs indexing. As an example of CORESETs indexing, with 2 CORESETs, RS associated with the lower CORESET index is included in set of $q_{0,1}$ (/panel1) and RS associated with the higher CORESET index is included in set of q0,2 (/panel2). As a further example, (e.g. considering 2 different CORESET index values and 2 different index values for sets of q0) the RS associated with lower (or lowest) CORESET index is included in the set of q0 with lower (or lowest) index of the sets of q0 and the RS associated with higher (or highest)

CORESET index is included in the set of q0 with higher (or highest) index of the sets of q0. Alternatively, the UE may include the RS according to the predetermined rule of CORESETs indexing, e.g., with 2 CORESETs, RS associated with the higher CORESET index is included in set of $q_{0,1}$ (/panel1 or the set of q0 with the lower index) and RS associated with the lower CORESET index is included in set of $q_{0,2}$ (/panel2 or set of q0 with the higher index). In yet one more example in case of N CORESETs and N sets of BFD-RS ($q_0$) and the UE may determine to include the RS to the sets according to ascending or descending order of the CORESET index and $q_0$ index. In case of N CORESETs, the UE may determine to include the RS associated with CORESETs in ascending/descending order to the ascending/descending order of indexes of $q_0$ up to the maximum $q_0$ index value. For example, the RS associated with CORESETs that cannot be included to the sets of $q_0$ due to less amount of $q_0$ sets than RS associated with CORESETs are ignored in beam failure detection (since not in the set). In other words, in an embodiment, the RS associated with CORESETs are included in the sets of $q_0$ in ascending or descending order until all RS are included to the respective sets so that maximum number of sets of $q_0$ are not exceeded. Alternatively, there may be less RS associated with CORESETs than number of sets of $q_0$, in this case UE may use similar rule of ascending or descending inclusion to the sets (and some sets may be empty, i.e., do not have any RS included). In yet one more alternative, there may be N to 1 mapping of RS to sets of $q_0$. As an example, if there are 4 RSs (associated with CORESETs #1 #2 #3 #4) and only 2 sets of $q_0$, UE may determine to map the RS according to the ascending/descending order of the CORESET index so that 2 RS (associated with lowest CORESET index values #1 and #2) are included in the first set and 2 RS (CORESET index values #3 and #4) are included in the second set. Other combinations are also possible, e.g., descending order or paired/non-paired index value. Alternatively, if the UE has reported RS and panel ID to the network in a beam report, then the linkage between DL RS and panel ID may be determined according to the reported information (that is, the network knows which RS are included in which set based on the UE beam report). In one example, the UE panel information (e.g., panel ID) may not be necessarily disclosed to network when the BFD-RS is divided based on the CORESET index. For instance, for the network to understand which panel/RS was in failure, the UE may indicate the failed BFD-RS set, e.g., set 0 or set 1. The RS associated with a CORESETs may refer to a DL-RS/DL-RS with qcl-typeD indicated by the active TCI State for the CORESET. In yet another example embodiment, UE may determine to include the RS associated with CORESETs for respective sets of q0 (as described herein) based on the RX beams (RX spatial filters). As an example of using RX spatial filters to determine RSs to be included in the sets of q0, UE may determine the different Rx spatial filters based on the qcl-typeD configuration for the RS (e.g. RS associated with different CORESETs with different qcl-typeD assumptions may be included in the different sets of q0 according to the rules described herein). Alternatively, the UE may determine to include the RS associated with CORESETs for respective sets of q0 (as described herein) based on the RX beams (spatial filters). The qcl-typeD assumption for reference signals may refer to a configuration or assumptions that e.g. two reference signals configured the QCL-typeD assumption (source RS and target RS) can be received by UE using the same spatial rx filter or beam (or panel). It is noted that, as used herein, the term "UE antenna panel" may be interchangeable with UE spatial filter (beam) or UE RX beam. For example, a situation where a UE receives data through multiple active UE panels may be equivalent to a situation where a UE receives data through multiple RX spatial filters. Similarly, a case where a UE transmits data through multiple active UE panels may be equivalent to a case where a UE transmits data through multiple TX spatial filters. In one example embodiment, a "UE antenna panel" may be a physical antenna panel at the UE. However, in some example embodiments, a "UE antenna panel" may be some logical entity or logical antenna panel, rather than the actual physical antenna panel at the UE. For example, a logical antenna panel may include one or multiple antenna elements and associated one or multiple transceiver chains, etc.

Figure 2:
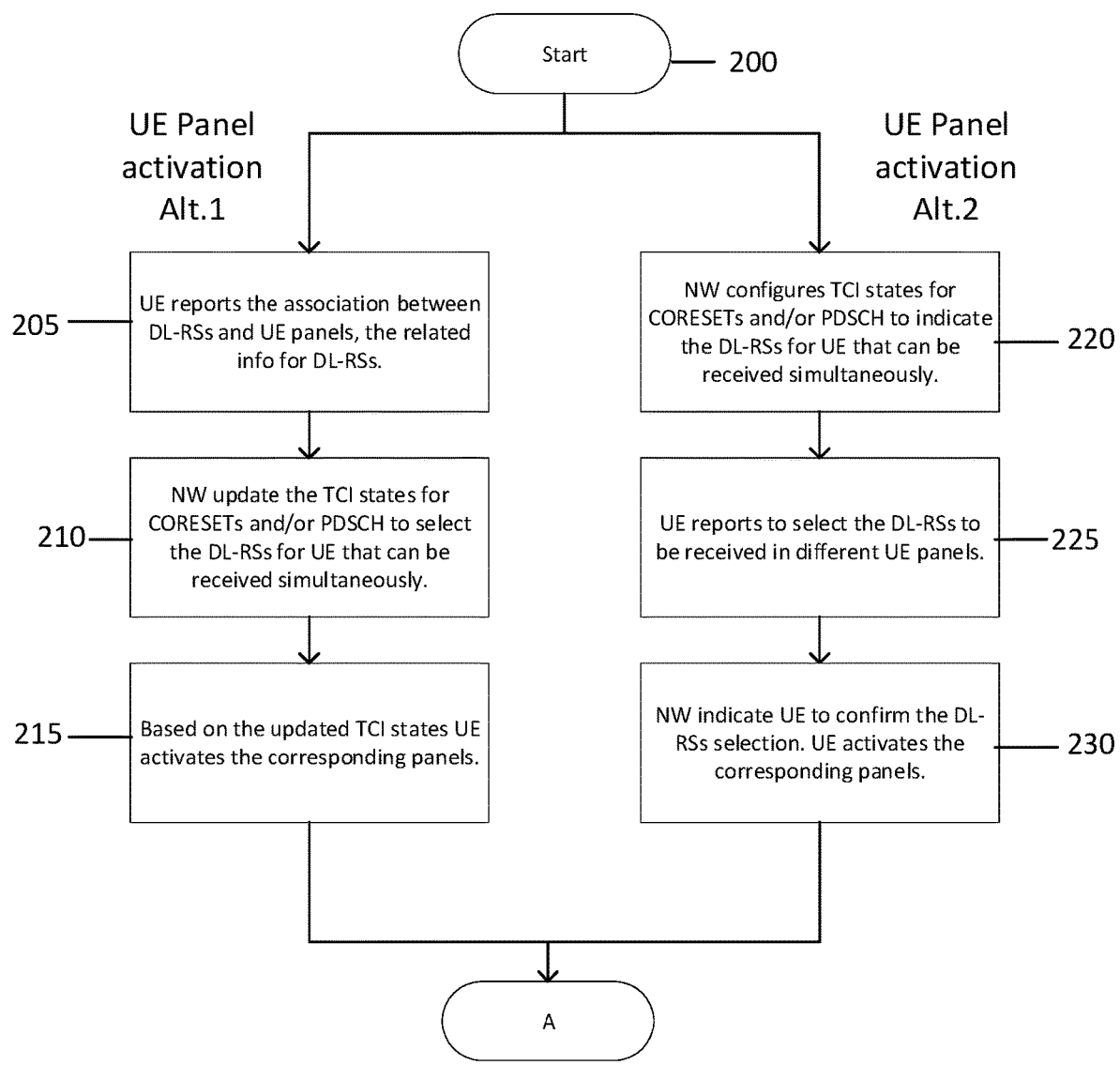
FIG. 2 illustrates an example flow diagram of a method, according to an embodiment.

Certain example embodiments may provide several alternatives for UE panels activation. FIG. 2 illustrates an example flow diagram depicting UE panels selection and activation according to two alternatives (i.e., Alt 1 and Alt 2). As illustrated in the example of FIG. 2, the method may begin at 200 and, according to the first alternative, at 205, a UE may transmit one or more reports to the network with the DL-RSs information. For example, the UE may report the association between DL-RSs and UE panels, and the related information for DL-RSs. In certain embodiments, the reports may include at least two distinct DL-RSs that can be received simultaneously. If more than two DL-RSs are reported, the reports may implicitly or explicitly indicate the associations between the reported DL-RSs and the DL available panels such that each DL available panel is associated with at least one distinct DL-RS. In one example, the reports may include the L1-reference signal received power (RSRP) and/or signal-to-interference noise ratio (SINR) for each DL-RS. According to some embodiments, the report may implicitly or explicitly indicate the association between the DL-RSs and $q_0$ set(s).

As further illustrated in the example of FIG. 2, at 210, the network may update the TCI states for CORESETs and/or PDSCH to select the DL-RSs for the UE that can be received simultaneously. According to some embodiments, assuming just two active UE panels are allowed for DL simultaneous reception, based on UE's reports, the network can indicate the UE DL panels selection with one or more of the following configurations: at least two active distinct panel dedicated TCI states are configured for the CORESETs that are associated with two DL TX beams for two active UE panels; one active TCI states is configured for all of the CORESETs and the active TCI state is associated with one DL TX beam for one UE panel—at least two distinct TCI states that are associated with two DL TX beams for two UE panels are active in PDSCH TCI state list; and/or the active TCI states for CORESETs and PDSCH are associated with the DL-RSs for one UE panel. At 215, the UE may activate the corresponding panels based on the updated TCI states. For example, based on the active TCI states in CORESETs or PDSCH, the UE may determine the two active panels for DL reception.

As further illustrated in the example of FIG. 2, according to the second alternative for UE panels activation, at 220, the network may configure one or more active TCI states for the CORESETs or PDSCH to indicate the DL-RSs that can be used for UE DL simultaneous reception. In an embodiment, assuming just two active UE panels are allowed for DL simultaneous reception, the UE may determine the active panel(s) for DL reception based on the active TCI states in the CORESETs and PDSCH. At 225, the UE may transmit a report to the network to select the DL-RSs to be received in different UE panels. For example, the UE may transmit reports to the network with the DL-RSs information, which may include at least two distinct DL-RSs that can be received simultaneously. The reports may implicitly or explicitly indicate the associations between the reported DL-RSs and the DL panels such that each DL panel is associated with one distinct DL-RS. In some embodiments, the reports may include the L1-RSRP and/or SINR for each DL-RS. According to an embodiment, the report may indicate the association between the DL-RSs and $q_0$ set(s). In an embodiment, at 230, the network may transmit an indication to the UE to confirm that the two beams associated with the reported two DL-RSs can be used for simultaneous DL, and the UE may activate the corresponding panels. According to an embodiment, if the UE does not report to the network to indicate the availability of multiple panels or any panel related information for panels selection, the UE may use one panel for both UL and DL and the Release-15/Release-16 BFD/BFRQ scheme may be applied.

Figure 3:
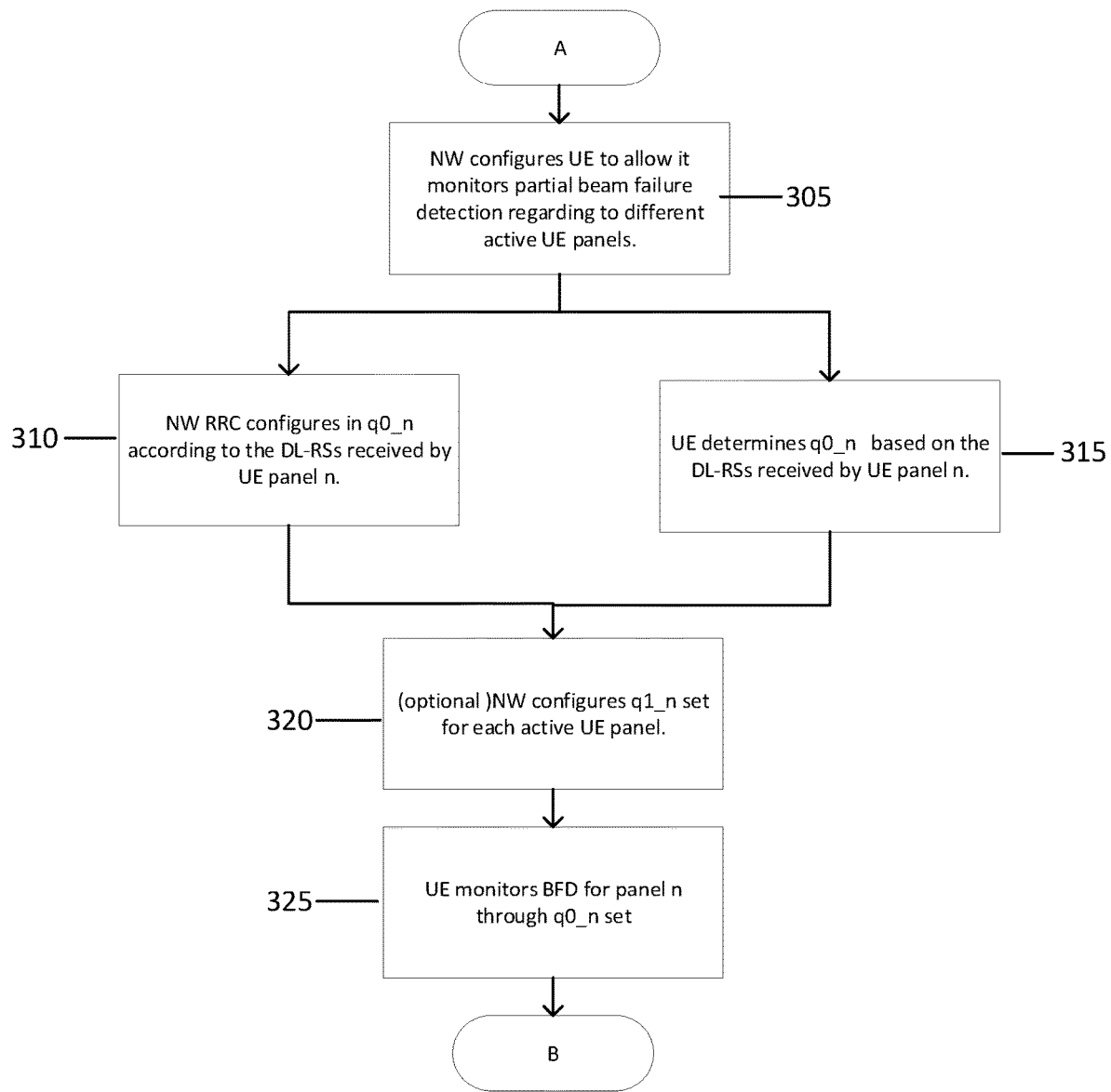
FIG. 3 illustrates an example flow diagram of a method, according to an embodiment.

Certain embodiments may provide a configuration of two sets of $q_0$ and $q_1$, for multiple UE active panels. FIG. 3 illustrates an example flow diagram of a method for configuration of $q_0$ and $q_1$ for multiple UE panels, according to some embodiments. As illustrated in the example of FIG. 3, at 305, the network may configure the UE to allow it to monitor partial beam failure detection with regard to different active UE panels. According to an embodiment, if two UE panels are active for DL reception, different alternatives may be provided for the network to indicate to the UE to proceed with partial (panel-wise) beam failure detection. For example, as illustrated at 310, the network may RRC configure the n-th $q_0$ set according to the DL-RS received by UE panel n. Alternatively, at 315, the UE may determine the n-th $q_0$ set based on the DL-RSs received by UE panel n. Therefore, in one embodiment, the network may indicate to the UE, in a MAC CE/PDSCH/PDCCH, that it can perform partial beam failure detection. Alternatively or additionally, the UE can be configured with higher layer parameters (e.g., RRC layer parameters) indicating that it can perform partial (panel-wise) beam failure detection. With the indications, the UE can partition the one $q_0$ set into two subsets $q_{0,n}$, n=1,2 such that each $q_{0,n}$ set is for one active UE DL panel. The UE may then perform beam failure detection based on $q_{0,n}$. Optionally, at 320, the network may configure $q_{1,n}$ set for each active UE panel. Then, at 325, the UE may monitor BFD for panel n through $q_{0,n}$ set.

In a further embodiment, the network may configure, via RRC, the UE with two beam failure detection sets $q_{0,n}$, n=1,2 and coresetPoolIndex with single value. A MAC CE/PDSCH/PDCCH/RRC may implicitly or explicitly indicate that the UE is allowed to perform partial (panel-wise) beam failure detection where each $q_{0,n}$ set is for one UE DL panel BFsD. If the UE is configured with two BFD sets $q_{0,n}$, n=1, 2, two coresetPoolIndex values and is not indicated for partial beam failure detection, then the UE may perform BFD per $q_{0,n}$ set according to the TCI states in CORESETs associated with per coresetPoolIndex.

In some embodiments, the network can use MAC CE/RRC to turn off the partial beam failure detection explicitly. Alternatively or additionally, the network can use MAC CE to update the TCI states for CORESETs/PDSCH to allow one receiving panel at the UE so that the partial beam failure detection is turned off implicitly.

In one embodiment, the network may configure DL-RSs for $q_{0,n}$ implicitly. For example, the CORESETs may be with at least two active TCI states and each of which may be associated with one UE active panel dedicated DL-RS. According to one example, $q_{0,n}$ may include the DL-RSs indexes for active UE panel n based on the active TCI states in CORESETs. The UE may determine itself to include the RS to the respective $q_{0,n}$ sets based on the RX panel assumptions.

In a further embodiment, the network may configure DL-RSs for $q_{0,n}$ explicitly. For example, the network may configure, via RRC, $q_{0,n}$ such that $q_{0,n}$ includes the DL-RSs indexes for active UE panel n. It is noted that $q_{1,n}$, n=1, 2 may be denoted as candidate beam set for each active UE panel, and the configuration of $q_{1,n}$ can be according to the following. If the UE is allowed to have two $q_{0,n}$, the UE may expect the network to configure one or two $q_1$ sets. If two $q_1$ are configured, the association between the $q_1$ set and the UE panel may be explicitly or implicitly indicated. If one set $q_1$ is configured, the association between the RSs in $q_1$ and the UE panel may be explicitly or implicitly indicated. If $q_{0,n}$, n=1, 2 are configured implicitly through active CORESETs TCI states, the network can use a new MAC CE to indicate $q_1$ (or $q_{1,n}$) for respective set(s) of $q_0$ (or $q_{0,n}$) corresponding to active UE panels. If the network does not provide UE with the $q_1$ (or $q_{1,n}$), the UE may assume that all SSB indexes are candidates. The UE may indicate to the network the new candidate beam set, e.g., based on which panel it received the SSB.

Certain embodiments may provide partial BFD for two active UE panels. In one embodiment, the BFD method provided in 3GPP TS TS 38.213 and TS 38.321 may be applied for each $q_{0,n}$ ∀n independently. In other words, according to an embodiment, the active UE panel n will be detected for beam failure if, within time beamFailureDetectionTimer, the event of L1 measured powers of the RSs in $q_{0,n}$ are less than $Q_{out,LR}$ is indicated more than beamFailureInstanceMaxCount of times.

Some embodiments may provide BFRQ for two active UE panels. For example, in a case where just one UE active panel is capable for UL at a time and assuming panel 1 is used for both DL data reception and UL data transmission and panel 2 is for DL reception only, given that BFD can be declared from different panel(s), the beam failure recovery procedure may be provided as follows. If panel 1 is declared for BFD or both panel 1 and panel 2 are declared for BFD, the UE may select the RS in the union set $U^2_{n=1} q_{1,n}$ with the maximal measured power that is larger than or equal to 0 if it exists, and denote the selected RS as $q_{new}$. By knowing $q_{new} \in q_{1,n}$, the UE may transmit the corresponding RACH preamble through the panel n to the network (e.g., to the gNB) and request for CFRA BFR. If such $q_{new}$ does not exist, e.g., the RSs in the union set $U^2_{n=1} q_{1,n}$ having power less than $Q_{in,LR}$, or $q_{1,n}$ ∀n does not exist, CBRA BFR will be performed. If panel 2 is declared with BFD, the UE may transmit PUCCH-SR through panel 1 to the network (e.g. to the gNB) to request UL grant. After receiving the UL grant, the UE may transmit BFR MAC CE through panel 1 to the network and the MCE CE entity may include the cell index, the candidate RS IDs in $q_{1,2}$ and the related candidate RSs information. If the UE cannot detect any new candidate, it may indicate the failure of a BFD-RS set to the network without a candidate beam information. Upon indication, the UE may discontinue monitoring PDCCH on the CORESETs associated with failed DL-RSs.

Figure 4:
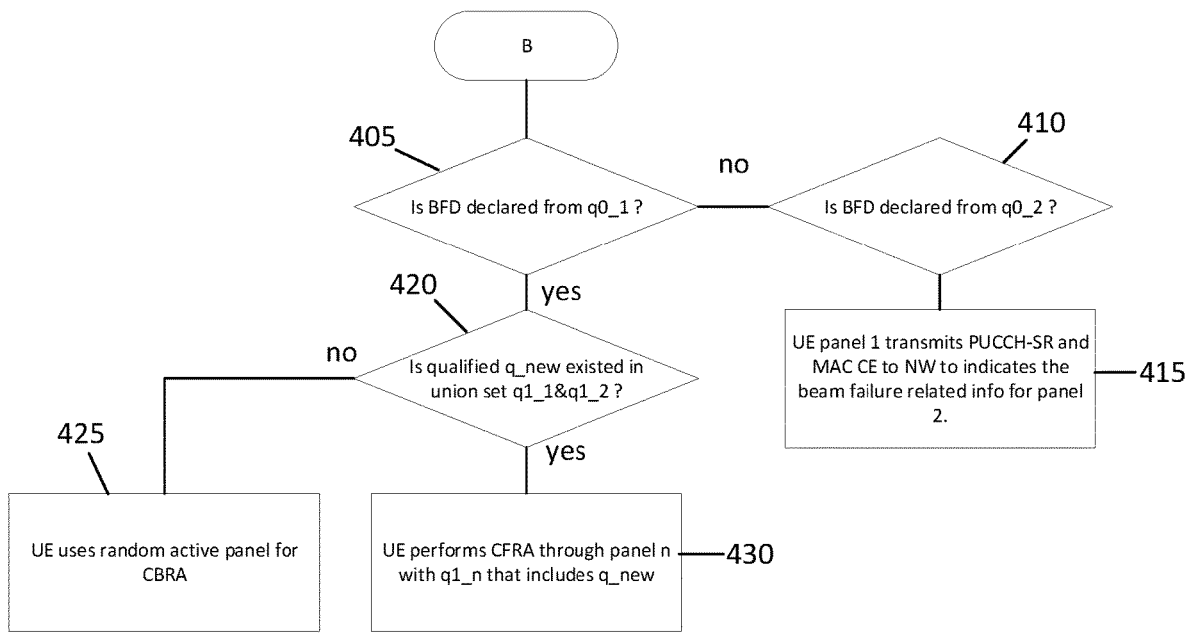
FIG. 4 illustrates an example flow diagram of a method, according to an embodiment.

FIG. 4 illustrates an example flow chart of a method of BFRQ for a UE that has one UL panel at a time, according to one embodiment. As illustrated in the example of FIG. 4, the method may include, at 405, determining if BFD is declared from $q_{0,1}$. If it is determined that BFD is not declared from $q_{0,1}$, the method may include, at 410, determining if BFD is declared from q0,2. If it is determined that BFD is declared from q0,2, then the method may include, at 415, UE panel 1 transmitting PUCCH-SR and MAC CE to NW to indicate the beam failure related information for panel 2. If it is determined that BFD is declared from $q_{0,1}$, the method may include, at 420, determining whether a qualified $q_{new}$ exists in the union set of $q_{1,1}$ and $q_{1,2}$. If it is determined that a qualified $q_{new}$ does not exist in the union set of $q_{1,1}$ and $q_{1,2}$, the method may include, at 425, the UE using a random active panel for CBRA BFR. If it is determined that a qualified $q_{new}$ does exist in the union set of $q_{1,1}$ and $q_{1,2}$, the method may include, at 430, the UE performing CFRA BFR through panel n with $q_{1,n}$ that includes $q_{new}$.

In case where more than one (or all) UE active panels are capable for UL simultaneously and assuming panel 1 and panel 2 are used for both DL data reception and UL data transmission, the BFR procedure may be performed as follows. If panel 1 or panel 2 is declared BFD, the UE may transmit PUCCH-SR from the other active panel to the network for requesting UL grant. After receiving the UL grant, the UE may transmit BFR MAC CE through the other active panel to the network and the MCE CE entity may include the cell index, the candidate RS IDs in $q_{1,n}$, and the related candidate RSs information for the BFD panel. If the UE cannot detect any new candidate, the UE may indicate the failure of a BFD-RS set to network without a candidate beam information. Upon indication, the UE may discontinue monitoring PDCCH on the CORESETs associated with failed DL-RSs. If both panel 1 and panel 2 are declared for BFD, the UE may select the RS in the union set $U^2_{n=1} q_{1,n}$ with the maximal measured power that is larger than or equal to $Q_{in,LR}$, if it exists, and denote the selected RS as $q_{new}$. By knowing $q_{new} \in q_{1,n}$, the UE may transmit the corresponding RACH preamble through the panel n to the network (e.g., to the gNB) and request for CFRA BFR. If such $q_{new}$ does not exist, e.g., all RS in the union set $U^2_{n=1} q_{1,n}$ has power less than $Q_{in,LR}$, or $q_{1,n}$ Un does not exist, CBRA BFR will be proceeded.

Figure 5:
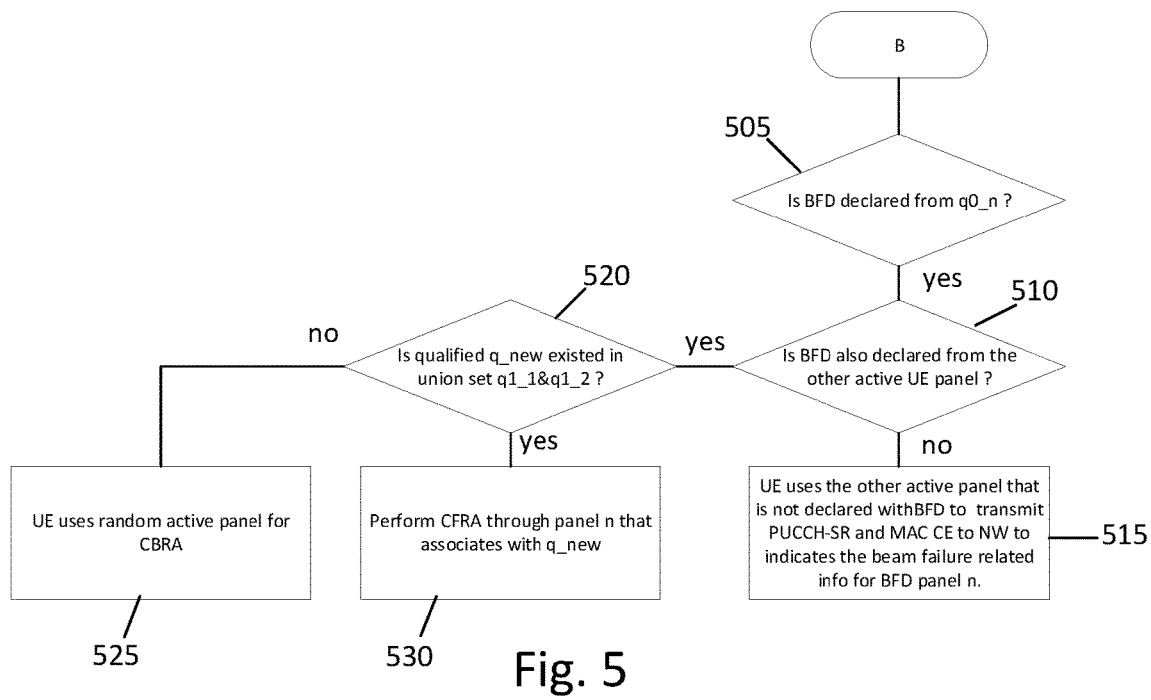
FIG. 5 illustrates an example flow diagram of a method, according to an embodiment.

FIG. 5 illustrates an example flow chart of a method of BFRQ for a UE that has two UL panels at a time, according to one embodiment. As illustrated in the example of FIG. 5, the method may include, at 505, determining if BFD is declared from $q_{0,n}$. If it is determined that BFD is declared from $q_{0,n}$, then it may be determined, at 510, whether BFD is also declared from the other active UE panel. If BFD is not declared from the other active UE panel, the method may include, at 515, the UE using the other active panel that is not declared with BFD to transmit PUCCH-SR and MAC CE to the network to indicate the beam failure related information for BFD panel n. If BFD is declared from the other active UE panel, the method may include, at 520, determining whether qualified $q_{new}$ exists in the union set of $q_{1,1}$ and $q_{1,2}$. If it is determined that a qualified $q_{new}$ does not exist in the union set of $q_{1,1}$ and $q_{1,2}$, the method may include, at 525, the UE using a random active panel for CBRA BFR. If it is determined that a qualified $q_{new}$ does exist in the union set of $q_{1,1}$ and $q_{1,2}$, the method may include, at 530, the UE performing CFRA BFR through panel n with $q_{1,n}$ that includes $q_{new}$.

In one further example embodiment, multiple devices or UEs may reside close to each other and/or form a cluster of devices. This cluster of devices can be considered to form a (single) UE from the system point of view. Then, each device may represent a panel of the "UE" and a panel (or a sub-UE) specific BFD can mean link failure for a panel/ sub-UE (e.g., a UE with one panel represents one panel from BFD perspective as described herein). As an example, the cluster of UEs or use of a cluster of UEs to be considered as one UE from the network perspective may be specific for XR applications. For instance, XR-applications may have multiple devices close to each other and this cluster of devices can form a UE from system point of view. For example, virtual reality or augmented reality applications using, e.g., goggles that comprise one UE for both eyes or goggles and other device(s) used in XR application. Another motivation for the "panel" specific BFD could be the fact that UEs are actually having physical panels with different capabilities (e.g., where not all the panels are of equal size and/or have equal performance (gain/power)).

Figure 6A:
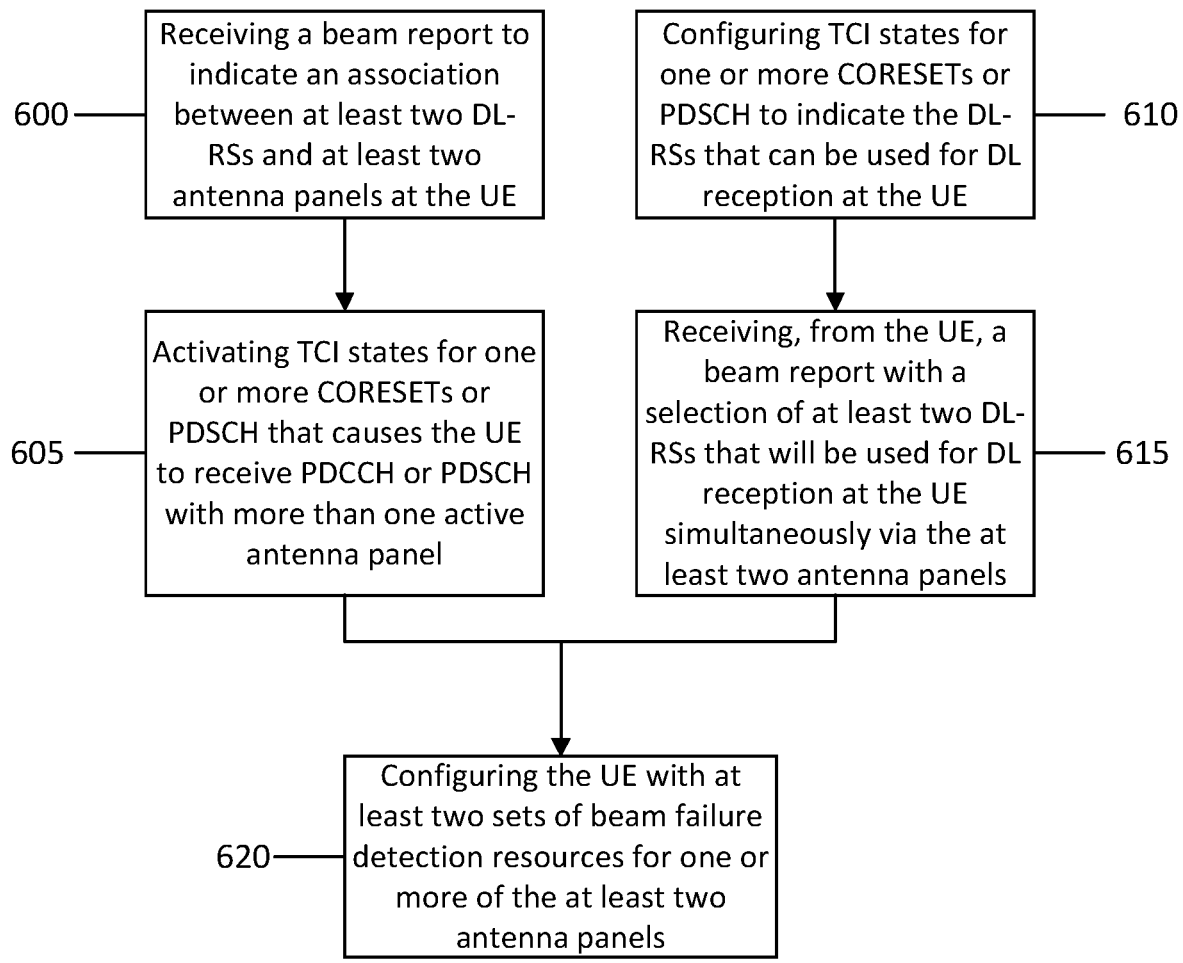
FIG. 6A illustrates an example flow diagram of a method, according to an embodiment.

FIG. 6A illustrates an example flow diagram of a method for beam failure detection and/or beam failure recovery, according to an example embodiment. In certain example embodiments, the flow diagram of FIG. 6A may be performed by a network entity or network node in a communications system, such as LTE or 5G NR. In some example embodiments, the network entity performing the method of FIG. 6A may include or be included in a base station, access node, node B, eNB, gNB, NG-RAN node, transmission-reception points (TRPs), high altitude platform stations (HAPS), relay station or the like. In one embodiment, the network node performing the method of FIG. 6A may include a gNB or similar radio node.

As illustrated in the example of FIG. 6A, the method may include, at 600, receiving, from a UE, a beam report to indicate an association between at least two DL-RSs and at least two antenna panels at the UE and, at 605, activating TCI states for one or more CORESETs or PDSCH that causes the UE to receive PDCCH or PDSCH with more than one active antenna panel. Alternatively, as illustrated in the example of FIG. 6A, the method may include, at 610, configuring TCI states for one or more CORESETs or PDSCH to indicate the DL-RSs that can be used for DL reception at the UE and, at 615, receiving, from the UE, a beam report comprising an indication of a selection of at least two DL-RSs that will be used for DL reception at the UE simultaneously through the at least two antenna panels.

As further illustrated in the example of FIG. 6A, the method may include, at 620, configuring the UE with at least two sets of beam failure detection resources for one or more of the at least two antenna panels. In an embodiment, the configuring 620 may include implicitly or explicitly configuring the user equipment with the at least two sets of beam failure detection resources. When one of the at least two sets of beam failure detection resources are configured implicitly, the method may include transmitting an indication, to the UE, that the UE can partition the one of the at least two sets of beam failure detection resources that are configured implicitly into two subsets. When the at least two sets of beam failure detection resources are configured explicitly, the method may include configuring the at least two sets of beam failure detection resources such that each of the beam failure detection resources are associated with one of the active antenna panels.

In some example embodiments, the method may include updating, using a MAC CE, one or more candidate beam failure detection resource sets to include RSs associated to different active antenna panels. According to certain embodiments, the beam report received from the UE may include at least one of: at least two distinct DL RSs that can be received simultaneously at the UE, an implicit or explicit indication of the associations between the reported at least two DL RSs and the active antenna panels such that each of the active antenna panels are associated with at least one distinct DL RS when more than two distinct DL RSs are included, at least one of a L1-RSRP or SINR for the at least two distinct DL RSs, or an implicit or explicit indication of the association between the at least two DL RSs and the at least two sets of beam failure detection resources.

According to some embodiments, to indicate a selection of the antenna panels, the method may include configuring at least two active distinct panel dedicated TCI states for CORESETs that are associated with two DL transmit beams for two active antenna panels, configuring one active TCI state for the CORESETs and the active TCI state is associated with one DL transmit beam for one antenna panel, and at least two distinct TCI states associated with two DL transmit beams for two antenna panels are active in a PDSCH TCI state list, or associating the active TCI states for CORESETs and PDSCH with the DL RSs for one of the antenna panels.

In certain embodiments, when the beam report from the UE includes an indication of a selection of at least two DL RSs that will be used for DL reception at the UE simultaneously, the method may include transmitting an indication to the UE to confirm the selected at least two DL RSs can be used for simultaneous DL reception. According to an embodiment, when two antenna panels are active for DL reception, the method may include transmitting an indication to the UE to proceed with partial beam failure detection. In one embodiment, the transmitting of the indication may include transmitting an indication, via a MAC CE or PDSCH or PDCCH, that the UE can perform partial beam failure detection, or the transmitting of the indication may include transmitting a configuration with RRC layer parameters indicating that the UE can perform partial beam failure detection. According to another embodiment, the transmitting of the indication may include transmitting a RRC configuration of two beam failure detection sets and control resource set pool index (coresetPoolIndex) with a single value, and transmitting an implicit or explicit indication, via a MAC CE or PDSCH or PDCCH, that the UE is allowed to perform the partial beam failure detection where each of the two beam failure detection sets is for detecting one antenna panel beam failure.

Figure 6B:
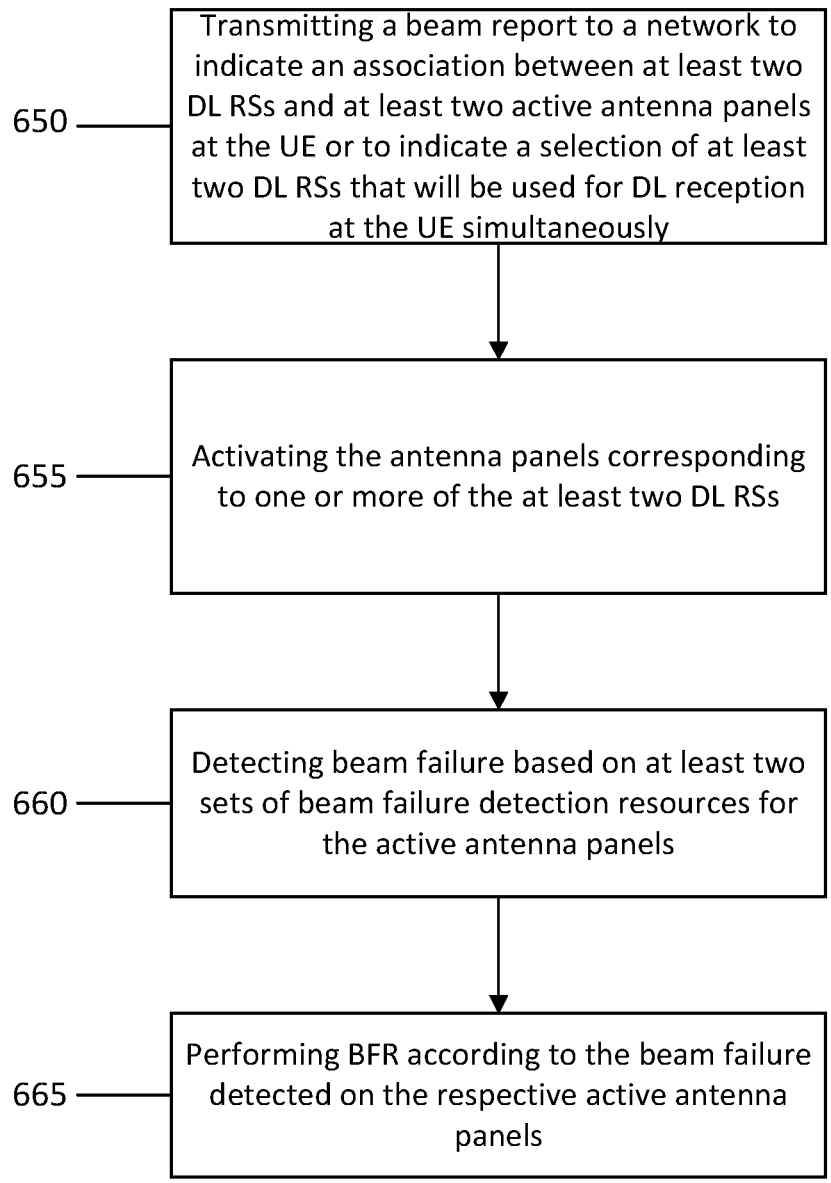
FIG. 6B illustrates an example flow diagram of a method, according to an embodiment.

FIG. 6B illustrates an example flow diagram of a method for beam failure detection and/or beam failure recovery, according to one embodiment. In certain example embodiments, the flow diagram of FIG. 6B may be performed by a network entity or network node in a communications system, such as LTE or 5G NR. In some example embodiments, the network entity performing the method of FIG. 6B may include or be included in UE (e.g., a multi-panel UE), communication node, mobile equipment (ME), mobile station, mobile device, stationary device, IoT device, or other device.

As illustrated in the example of FIG. 6B, the method may include, at 650, transmitting a beam report to a network to indicate an association between at least two DL RSs and at least two active antenna panels at the UE or to indicate a selection of at least two DL RSs that will be used for DL reception at the UE simultaneously. In one example embodiment, the method may optionally include, at 655, activating the antenna panels corresponding to one or more of the at least two DL RSs. For example, the activating 655 may include activating the antenna panels based on TCI states updated or activated by the network or based on the selection of the at least two DL RSs. According to one embodiment, the method may include, at 660, detecting beam failure based on at least two sets of beam failure detection resources for the at least two active antenna panels. The at least two sets of beam failure detection resources may include one or more BFD-RSs. In an embodiment, the method may include, at 665, performing BFR according to the beam failure detected on the set of beam failure detection resources for the respective UE active antenna panels, e.g., based on the failed BFD-RS(s) in the set corresponding to the DL RS(s) received on a specific antenna panel.

In some embodiments, when one or more of the at least two sets of beam failure detection resources are configured implicitly, the method may include receiving an indication of partitioning the one set of beam failure detection resources into at least two subsets, and determining the downlink reference signals at each of the subsets from the transmission configuration indicator (TCI) states, wherein each of the subsets is for one of the active antenna panels. In another embodiment, when the at least two sets of beam failure detection resources are configured explicitly, at least two sets of beam failure detection resources are configured such that each of the beam failure detection resources are associated with one of the active antenna panels.

According to certain embodiments, the performing 665 of the BFR may include, when one of the active antenna panels is for both UL and DL and another of the active antenna panels is for DL only, and when the active antenna panel for both the UL and DL is detected as beam failure or when the active antenna panel for both the UL and DL and the active antenna panel for the DL only are detected as beam failure, selecting a qualified RS within the at least two sets of beam failure detection resources for contention free random access (CFRA) BFR, or if a qualified RS does not exist, performing contention based random access (CBRA) BFR. In some embodiments, the performing 665 of the BFR may include, when one of the antenna panels is for UL and DL and another of the antenna panels is for DL only, and when the DL only antenna panel is detected for beam failure, reusing, through the UL and DL antenna panel, a SCell BFRQ framework for the DL only panel and receiving, from the network, BFRQ related information for the DL only antenna panel.

In certain embodiments, the performing 665 of the BFR may include, when both of the antenna panels are for uplink and downlink, and when one of the antenna panels is detected as beam failure, reusing, through the other antenna panel, a SCell BFRQ framework for the antenna panel detected as beam failure and receiving, from the network, BFRQ related information for the antenna panel detected as beam failure. According to some embodiments, the performing 665 of the BFR may include, when both of the antenna panels are for uplink and downlink, and when both of the antenna panels are detected as beam failure, selecting a qualified reference signal within the at least two sets of beam failure detection resources for CFRA BFR, or if a qualified reference signal does not exist, performing CBRA BFR.

According to some embodiments, the method may include determining to divide the DL RSs indicated by the TCI states for respective CORESETs into respective subsets according to a predefined rule, and determining the DL RSs according to the predefined rule of CORESETs indexing.

In some embodiments, the transmitting 650 may include transmitting a beam report comprising at least one of: at least two distinct DL RSs that can be received simultaneously at the UE, an implicit or explicit indication of the associations between the reported at least two DL RSs and the active antenna panels such that each of the active antenna panels are associated with at least one distinct DL RS when more than two distinct DL RSs are included, at least one of a L1-RSRP or SINR for the at least two distinct DL RSs, or an implicit or explicit indication of the association between the at least two DL RSs and the at least two beam failure detection resource sets.

According to certain embodiments, at least two active distinct panel dedicated TCI states may be configured for CORESETs that are associated with two DL transmit beams for two active antenna panels. Additionally or alternatively, one active TCI state is configured for the CORESETs and the active TCI state is associated with one DL transmit beam for one antenna panel, and at least two distinct TCI states associated with two DL transmit beams for two antenna panels are active in a PDSCH TCI state list. Additionally or alternatively, the active TCI states for CORESETs and PDSCH are associated with the DL RSs for one of the antenna panels.

In some embodiments, the method may include determining the active antenna panels for DL reception based on the active TCI states in CORESETs or PDSCH. According to an embodiment, the method may include receiving an indication, from the network, to confirm that the two beams associated with the reported at least two distinct downlink reference signals can be used for simultaneous downlink reception.

In one embodiment, when two antenna panels are active for DL reception, the method may include receiving an indication from the network to proceed with partial beam failure detection. According to certain embodiments, the receiving may include receiving an indication, via a MAC CE or PDSCH or PDCCH, that the UE can perform partial beam failure detection, or the receiving may include receiving a configuration with RRC layer parameters indicating that the UE can perform partial beam failure detection. In an embodiment, the method may then include using the indication or configuration to partition one of the at least two sets of beam failure detection resources into two subsets such that each subset is for one active antenna panel and detecting the beam failure based on the subsets. According to some embodiments, the receiving may include receiving a RRC configuration of two beam failure detection sets and control resource set pool index (coresetPoolIndex) with a single value, and receiving an implicit or explicit indication, via a MAC CE or PDSCH or PDCCH, that the UE is allowed to perform the partial beam failure detection, where each of the two beam failure detection sets is for detecting one antenna panel beam failure.

According to one embodiment, the UE may be configured to form a cluster with other UEs that are in close vicinity such that each of the UEs are configured to form an antenna panel of the cluster, and a panel specific BFD may occur when there is a failure of one or more of the UEs in the cluster.

Figure 7A:
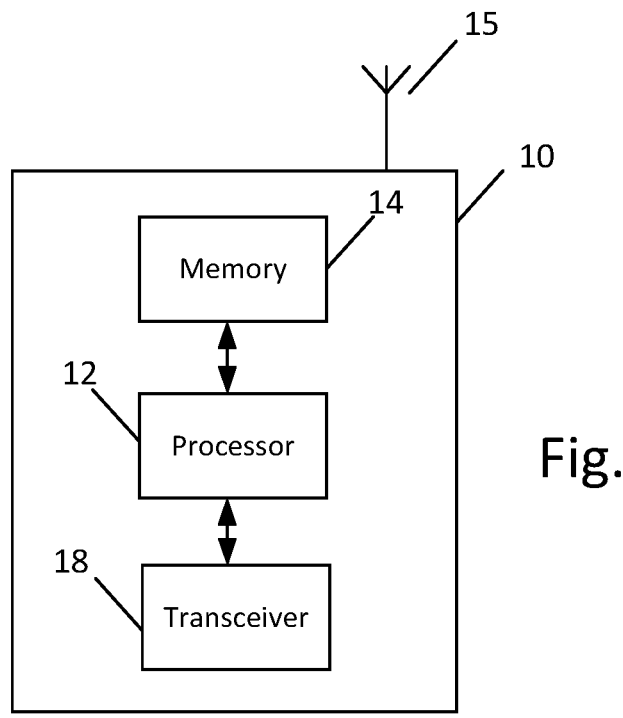
FIG. 7A illustrates an example block diagram of an apparatus, according to an embodiment.

FIG. 7A illustrates an example of an apparatus 10 according to an embodiment. In an embodiment, apparatus 10 may be a node, host, or server in a communications network or serving such a network. For example, apparatus 10 may be a network node, a sensing node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 7A.

As illustrated in the example of FIG. 7A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 7A, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), Multe-Fire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network element or RAN node, such as a base station, access point, Node B, eNB, gNB, TRP, HAPS, IAB node, WLAN access point, or the like. In one example embodiment, apparatus 10 may be a gNB or other radio node. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 1-6, or any other method described herein. In some embodiments, as discussed herein, apparatus 10 may be configured to perform a procedure relating to beam failure detection and/or beam failure recovery, as discussed elsewhere herein, for example.

Figure 7B:
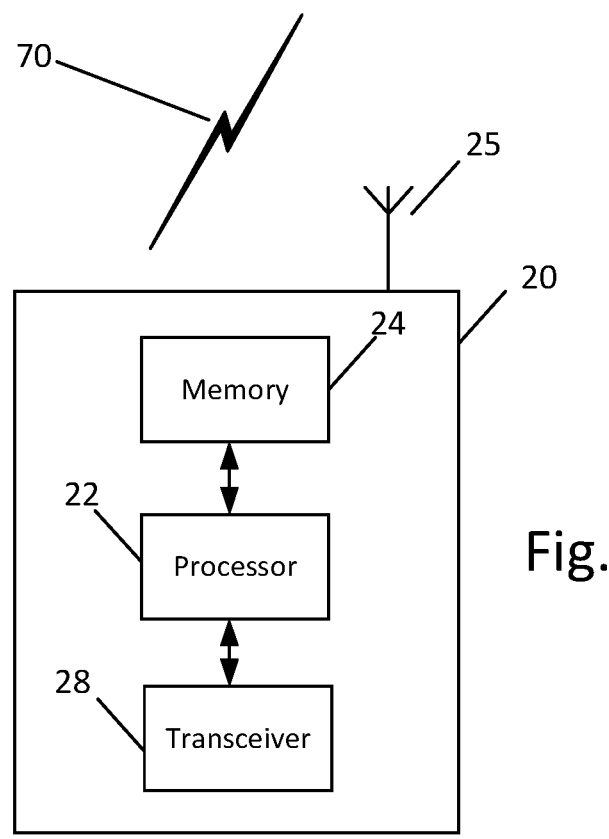
FIG. 7B illustrates an example block diagram of an apparatus, according to an embodiment.

FIG. 7B illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7B.

As illustrated in the example of FIG. 7B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to FIGS. 1-6, or any other method described herein. For example, in an embodiment, apparatus 20 may be controlled to perform a process relating to beam failure detection and/or beam failure recovery, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, displays, and/or computer program code for causing the performance of any of the operations described herein.

In view of the foregoing, certain example embodiments provide several technological improvements, enhancements, and/or advantages over existing technological processes and constitute an improvement at least to the technological field of wireless network control and/or management. For example, as discussed in detail above, certain example embodiments can enable a UE to report a partial panel beam failure event, which is not possible under the current framework. With such an ability, a UE can quickly recover the beam failure event for each DL panel and hence the system reliability can be improved. In addition, for panel specific BFD, a UE may have physical panels with different capabilities (e.g., having different sized and/or different performance capabilities) and, therefore, it can be beneficial to detect the beam failure in a panel specific manner. Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. An apparatus, comprising:
  at least one processor; and
  at least one memory including computer program code;
  the at least one memory and the computer program code being configured to, with the at least one processor, cause the apparatus at least to:
    transmit a beam report to a network to indicate an association between at least two downlink reference signals and at least two active antenna panels at the apparatus or to indicate a selection of at least two downlink reference signals that will be used for downlink reception at the apparatus simultaneously;
    detect beam failure based on at least two sets of beam failure detection resources for the at least two active antenna panels, wherein the at least two sets of beam failure detection resources comprise one or more beam failure detection reference signals; and
    determine to divide the downlink reference signals indicated by the transmission configuration indicator (TCI) states for respective control resource sets (CORESETs) into respective subsets according to a predefined rule, and determine the downlink reference signals according to the predefined rule of control resource sets (CORESETs) indexing.

2. The apparatus of claim 1, wherein the apparatus is further caused to:
  perform beam failure recovery according to the beam failure detected on the set of beam failure detection resources for the respective active antenna panels.

3. The apparatus of claim 2, wherein the performing of the beam failure recovery comprises:
  when one of the active antenna panels is for uplink and downlink and another of the active antenna panels is for downlink only,
  when the active antenna panel for both the uplink and the downlink is detected as beam failure, or when the active antenna panel for both the uplink and the downlink and the active antenna panel for the downlink only are detected as beam failure, the at least one memory and computer program code are configured, with the at least one processor, to cause the apparatus at least to select a qualified reference signal within one or two candidate beam resource sets for contention free random access (CFRA) beam failure recovery, or if a qualified reference signal does not exist, to perform contention based random access (CBRA) beam failure recovery, or
  when the downlink only antenna panel is detected for beam failure, the at least one memory and computer program code are configured, with the at least one processor, to cause the apparatus at least to reuse, through the uplink and downlink antenna panel, a secondary cell beam failure recovery request (BFRQ) framework for the downlink only panel with the panel associated information and the associated information of the candidate beam resource sets and receiving, from the network, beam failure recovery request (BFRQ) related information for the panel for downlink only,
  wherein the qualified reference signal comprises a reference signal with corresponding reference signal received power (RSRP) measurements that are larger than or equal to a predefined threshold.

4. The apparatus of claim 2, wherein the performing of the beam failure recovery comprises:
  when both of the antenna panels are for uplink and downlink,
  when one of the antenna panels is detected as beam failure, the at least one memory and computer program code are configured, with the at least one processor, to cause the apparatus at least to reuse, through the other antenna panel, a secondary cell beam failure recovery request (BFRQ) framework for the panel detected as beam failure with the panel associated information of the candidate beam resource sets and receiving, from the network, beam failure recovery request (BFRQ) related information for the antenna panel detected as beam failure, or when both of the antenna panels are detected as beam failure, the at least one memory and computer program code are configured, with the at least one processor, to cause the apparatus at least to select a qualified reference signal within one or two candidate beam resource sets for contention free random access (CFRA) beam failure recovery, or if a qualified reference signal does not exist, to perform contention based random access (CBRA) beam failure recovery, wherein the qualified reference signal comprises a reference signal with corresponding reference signal received power (RSRP) measurements that are larger than or equal to a predefined threshold.

5. The apparatus of claim 1, wherein, when at least one of the at least two sets of beam failure detection resources is configured implicitly, the at least one memory and computer program code are configured, with the at least one processor, to cause the apparatus at least to receive an indication of partitioning the one set of beam failure detection resources into at least two subsets, and determine the downlink reference signals at each of the subsets from the transmission configuration indicator (TCI) states, wherein each of the subsets is for one of the active antenna panels; or wherein, when the at least two sets of beam failure detection resources are configured explicitly, at least two sets of beam failure detection resources are configured such that each of the beam failure detection resources are associated with one of the active antenna panels.

6. The apparatus of claim 1, wherein the transmitting comprises transmitting a beam report comprising at least one of:

at least two distinct downlink reference signals that can be received simultaneously at the apparatus;

when more than two distinct downlink reference signals are included, an implicit or explicit indication of the associations between the reported at least two downlink reference signals and the active antenna panels such that each of the active antenna panels are associated with at least one distinct downlink reference signal;

at least one of a L1-reference signal received power (RSRP) or signal-to-interference noise ratio (SINR) for the at least two distinct downlink reference signals; or an implicit or explicit indication of the association between the at least two downlink reference signals and the at least two beam failure detection resource sets.

7. The apparatus of claim 6, wherein at least one of:

at least two active distinct panel dedicated transmission configuration indicator (TCI) states are configured for control resource sets (CORESETs) that are associated with two downlink transmit beams for two active antenna panels;

one active transmission configuration indicator (TCI) state is configured for the control resource sets (CORESETs) and the active transmission configuration indicator (TCI) state is associated with one downlink transmit beam for one antenna panel, and at least two distinct transmission configuration indicator (TCI) states associated with two downlink transmit beams for two active antenna panels are active in a physical downlink shared channel (PDSCH) transmission configuration indicator (TCI) state list; or the active transmission configuration indicator (TCI) states for control resource sets (CORESETs) and physical downlink shared channel (PDSCH) are associated with the downlink reference signals for one of the antenna panels.

8. The apparatus of claim 6, wherein the apparatus is further caused to:

determine the active antenna panels for downlink reception based on the active transmission configuration indicator (TCI) states in control resource sets (CORESETs) or physical downlink shared channel (PDSCH).

9. The apparatus of claim 6, wherein the apparatus is further caused to:

receive an indication, from the network, to confirm that the two beams associated with the reported at least two distinct downlink reference signals can be used for simultaneous downlink reception.

10. The apparatus of claim 1, wherein, when two antenna panels are active for downlink reception, the apparatus is further caused to receive an indication from the network to proceed with partial beam failure detection.

11. The apparatus of claim 10, wherein the receiving comprises receiving an indication, via a medium access control (MAC) control element (CE) or physical downlink shared channel (PDSCH) or physical downlink control channel (PDCCH), that the apparatus can perform partial beam failure detection, or wherein the receiving comprises receiving a configuration with radio resource control (RRC) layer parameters indicating that the apparatus can perform partial beam failure detection; and the apparatus is further caused to use the indication or configuration to partition one of the at least two sets of beam failure detection resources into two subsets such that each subset is for one active antenna panel and detecting the beam failure based on the subsets.

12. The apparatus of claim 10, wherein the apparatus is further caused to:

receive a radio resource control (RRC) configuration of two beam failure detection sets and control resource set pool index (coresetPoolIndex) with a single value, and receive an implicit or explicit indication, via a medium access control (MAC) control element (CE) or physical downlink shared channel (PDSCH) or physical downlink control channel (PDCCH), that the apparatus is allowed to perform the partial beam failure detection where each of the two beam failure detection sets is for detecting one antenna panel beam failure.

13. The apparatus of claim 1, wherein the apparatus is configured to form a cluster with other apparatus in close vicinity such that each of the apparatuses are configured to form an antenna panel of the cluster, and a panel specific beam failure detection comprises a failure of one of the apparatuses.

14. An apparatus, comprising:

at least one processor; and at least one memory comprising computer program code, the at least one memory and computer program code being configured to, with the at least one processor, cause the apparatus at least to:

receive, from a user equipment, a beam report to indicate an association between at least two downlink reference signals and at least two antenna panels at the user equipment and activating transmission configuration indicator (TCI) states for at least one control resource set (CORESET) or physical downlink shared channel (PDSCH) that causes the user equipment to receive physical downlink control channel (PDCCH) or physical downlink shared channel (PDSCH) with more than one active antenna panel, or to configure transmission configuration indicator (TCI) states for at least one control resource set (CORESET) or physical downlink shared channel (PDSCH) to indicate the downlink reference signals that can be used for downlink reception at the user equipment and receive, from the user equipment, a beam report comprising an indication of a selection of at least two downlink reference signals that will be used for downlink reception at the user equipment simultaneously through the at least two antenna panels; and configure the user equipment with at least two sets of beam failure detection resources for one or more of the at least two antenna panels; and transmit an indication, via a medium access control (MAC) control element (CE) or physical downlink shared channel (PDSCH) or physical downlink control channel (PDCCH), that the user equipment can perform partial beam failure detection, or wherein the transmitting comprises transmitting a configuration with radio resource control (RRC) layer parameters indicating that the user equipment can perform partial beam failure detection.

15. The apparatus of claim 14, wherein the configuring comprises implicitly or explicitly configuring the user equipment with the at least two sets of beam failure detection resources, wherein, when one of the at least two sets of beam failure detection resources are configured implicitly, the at least one memory and computer program code are configured, with the at least one processor, to cause the apparatus at least to transmit, to the user equipment, an indication that the user equipment can partition the one of the at least two sets of beam failure detection resources into two subsets; or wherein, when the at least two sets of beam failure detection resources are configured explicitly, the at least one memory and computer program code are configured, with the at least one processor, to cause the apparatus at least to configure at least two sets of beam failure detection resources such that each of the beam failure detection resources are associated with one of the active antenna panels.

16. The apparatus of claim 14, wherein the receiving comprises receiving a beam report comprising at least one of:

at least two distinct downlink reference signals that can be received simultaneously at the user equipment;

when more than two distinct downlink reference signals are included, an implicit or explicit indication of the associations between the reported at least two downlink reference signals and the active antenna panels such that each of the active antenna panels are associated with at least one distinct downlink reference signal;

at least one of a L1-reference signal received power (RSRP) or signal-to-interference noise ratio (SINR) for the at least two distinct downlink reference signals; or an implicit or explicit indication of the association between the at least two downlink reference signals and the at least two sets of beam failure detection resources.

17. The apparatus of claim 14, wherein the apparatus is further caused to:

transmit a radio resource control (RRC) configuration of two beam failure detection sets and control resource set pool index (coresetPoolIndex) with a single value, and transmitting an implicit or explicit indication, via a medium access control (MAC) control element (CE) or physical downlink shared channel (PDSCH) or physical downlink control channel (PDCCH), that the user equipment is allowed to perform the partial beam failure detection where each of the two beam failure detection sets is for detecting one antenna panel beam failure.

* * * * *